United States Patent [19]

Dwan

[11] 3,794,796

[45] Feb. 26, 1974

[54] ALCOHOL SECURITY INTERLOCK SWITCH DEVICE

[76] Inventor: Arthur Stanley Dwan, 23 Grenaby Rd., Croydon, England

[22] Filed: Apr. 10, 1972

[21] Appl. No.: 242,499

[30] Foreign Application Priority Data
Apr. 26, 1971 Great Britain..................... 11372/71
May 7, 1971 Great Britain..................... 13733/71

[52] U.S. Cl........................ 200/44, 70/1.7, 70/252, 70/284, 180/114, 200/61.08, 307/10 AT, 340/279
[51] Int. Cl........................................... H01h 27/00
[58] Field of Search.. 307/10 AT, 10 R; 340/63, 64, 340/279; 180/114; 70/252, 284, 1.7, 333 R; 200/61.08, 44, 42 R

[56] References Cited
UNITED STATES PATENTS
1,937,165 11/1933 Piagneri............................... 70/284

Primary Examiner—Robert K. Schaefer
Assistant Examiner—William J. Smith
Attorney, Agent, or Firm—Ralph E. Parker

[57] ABSTRACT

This invention is an alcohol security interlock switch for a motor vehicle comprising a locking mechanism disposed in a housing and operable by a key which, if inserted carefully and within a prescribed period by a driver with a steady hand, will start the motor of the motor driven vehicle, but, if the action is attempted by a driver under the influence of drink or drugs immobilisation of the motor will inevitably follow.

The locking mechanism includes a lock barrel assembly which is rotatable by the key and movable axially by relatively light pressure to operate an electro/mechanical immobilising mechanism.

10 Claims, 14 Drawing Figures

ALCOHOL SECURITY INTERLOCK SWITCH DEVICE

The present invention relates to a switch device for a motor vehicle and more particularly to a switch device which not only secures a vehicle against theft but also provides a means for testing the capability of a driver to take charge of the vehicle if influenced to some extent by drink or drugs or for any other physical reason.

A number of devices have from time to time been proposed to secure a vehicle not only against theft by anyone and also against being driven away by a driver under the influence of alcohol or drugs. Devices for alcohol-affected drivers have been proposed which are predominantly electronic and thus dependent on circuits easily rendered inoperable by those people wishing and able to by-pass the wiring needed for such devices, such people being either would-be thieves and/or drivers under the influence of drugs or drink.

It is an object of the present invention therefore to provide an improved device for immobilising motor vehicles which will also test in a simple form the potential user's co-ordination, steadiness and reaction time in mobilising it rather than attempting to measure the amount of alcohol intake and relate that to a pass or fail test mark.

According to one aspect of the present invention there is provided a switch device for a motor vehicle comprising a housing having key-operated locking apparatus movement of which operates mechanical means either for immobilising the vehicle or for rendering it capable of use and through electrical contacts and further mechanical means provides a capability test for the operator especially in resetting the device in its original condition if the movement immobilises the vehicle.

A preferred embodiment of the invention according to this aspect includes a timing mechanism which obliges the driver of the vehicle to operate the device in its original condition if immobilised within a prescribed period or a thermal cut-out will upset the switch device mechanism. This will entail waiting for a time during which the thermal cut-out mechanism is allowed to cool before the resetting procedure can be effected.

According to another aspect of the invention there is provided a switch device for a motor vehicle comprising a housing having a key-operated locking apparatus including a lock barrel assembly the turning of which by its key serves to operate means to immobilise the vehicle or co-operate in rendering the vehicle capable of use, the assembly being mounted in its housing so as to be capable of movement in its axial direction on insertion of the key, the assembly being constrained in its normal working position so as to be held therein against axial movement on insertion of the correct key, but moving if undue force is applied in the axial direction, to an "upset" position such that rotation thereof cannot operate the means for rendering the vehicle capable of use, and a timing mechanism actuated by presetting the switch device before inserting the key which obliges the operator to perform within a set period.

In a preferred embodiment the means for presetting the switch device includes a graduated ring after the manner of a combination lock.

A preferred embodiment of the invention according to either aspect includes a selector ring which must be turned to a predetermined number, a single number for the lock, and must be aligned visually with the key slot, no click indication being provided or variation in pressure being apparent, but only at the point of alignment is sufficient pressure built-up in a control plunger to allow the correct key to be inserted and then only with considerable care, since any clumsiness on the part of the operator in inserting the key will upset the device mechanism. Correct insertion and turning of the key will of course release the locked condition of the vehicle. As the switch device is normally fitted on the steering column of the vehicle, correct positioning of the key in the device and turning in the prescribed manner will release the steering and operate the engine contacts in accordance with common practice.

In the "upset" condition of the switch device, however, control of the components is disengaged. Likewise the electrical contacts are broken such that the key and the portion of the apparatus associated therewith rotates freely, thus rendering ineffective all methods of abuse whether by a thief or by a person under the influence of drugs or alcohol. If the device has been "upset" by clumsy action or interference by unauthorised persons, it can be reset only with the correct key, effected generally by returning the selector ring to the off or 0 position and then fully inserting the key and complying with certain movements, in this case, in a prototype, by giving the key a flick in a clockwise direction and then a complete turn to a point where the overhang of the key is in line with a mark between selected numbers 2 and 3. The key is then pulled and the portion associated therewith will move axially outwards; the key is then turned to "off" where the device is found to be reset and the key can now be removed.

On turning to this "off" position from the "run" position as opposed to resetting, the key will be arrested at 3, the engine will be cut out and the steering remains unlocked. If the key is left like this, it can be arranged that on opening the vehicle door, a signal will be operated. It may be an audible warning or visible flash drawing attention to the fact that the key has been left in the switch device. To extract the key, the selector ring must then be turned to a prearranged position, in this case, to 0 when the key can be turned to "off" and withdrawn leaving the device in the locked condition.

The arrangement of the apparatus movement should be such that an incongruous or undesirable situation cannot arise; for example, it should be impossible to have the steering locked and the engine "on" or the key withdrawn unless the steering is locked.

Again, the arrangement of the apparatus of the device is such that it cannot be upset when in the run position: this prevents the hazard of a "cut" engine arising due to, say, bumpy road conditions and also obviates harassment should the engine stall in traffic or such like, although this feature will provide an inertia switching off action in the event of a high frontal impact and, thus eliminate risk of fire.

It is not necessary to complete the test if the engine is stalled in the run position - just turn the key to the start position and release in the normal manner.

In a preferred embodiment any two levers should have the external widths made small to prevent the picking of the lock by holding against the housing and similarly any two levers should have the internal piercings made slightly larger to make it impossible to hold the levers with a central probe.

It should be mentioned at this point that if the battery supply be disconnected in order to compromise the timing aspect, a solenoid operated relay or plunger will hold the selector ring inoperable and thus make it impossible to insert the key without upsetting the lock.

A further feature which should be noted is that an embodiment of the invention may include an integrated module to give a long delay after a predetermined number of failures.

An embodiment of the invention will now be described, by way of example only, with reference to the accompanying drawings in which:

FIG. 6 is a like cross-section on the line VI — VI of FIG. 2; while,

Figure 1:
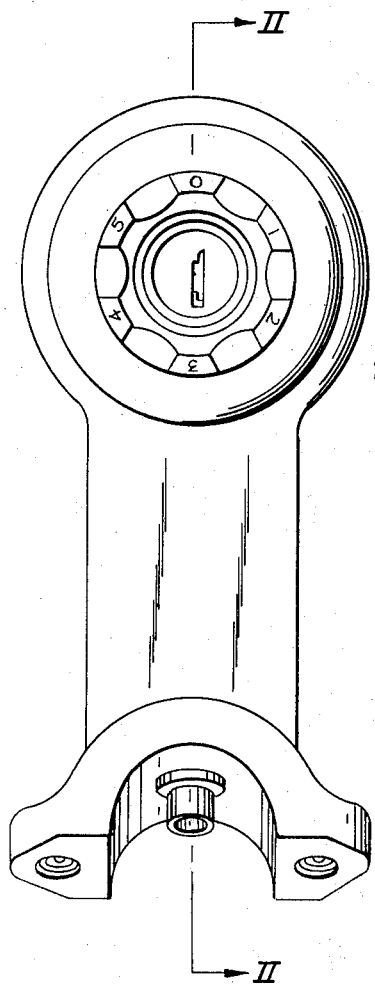
FIG. 1 is a perspective view of an alcohol security interlock switch device according to the invention.

Referring to the drawings, the device shown in perspective in FIG. 1 is adapted to be fitted to the steering column (not shown) of a motor vehicle or any other mechanical device rendering the vehicle undrivable, for example, gear lever, brakes.

Figure 2:
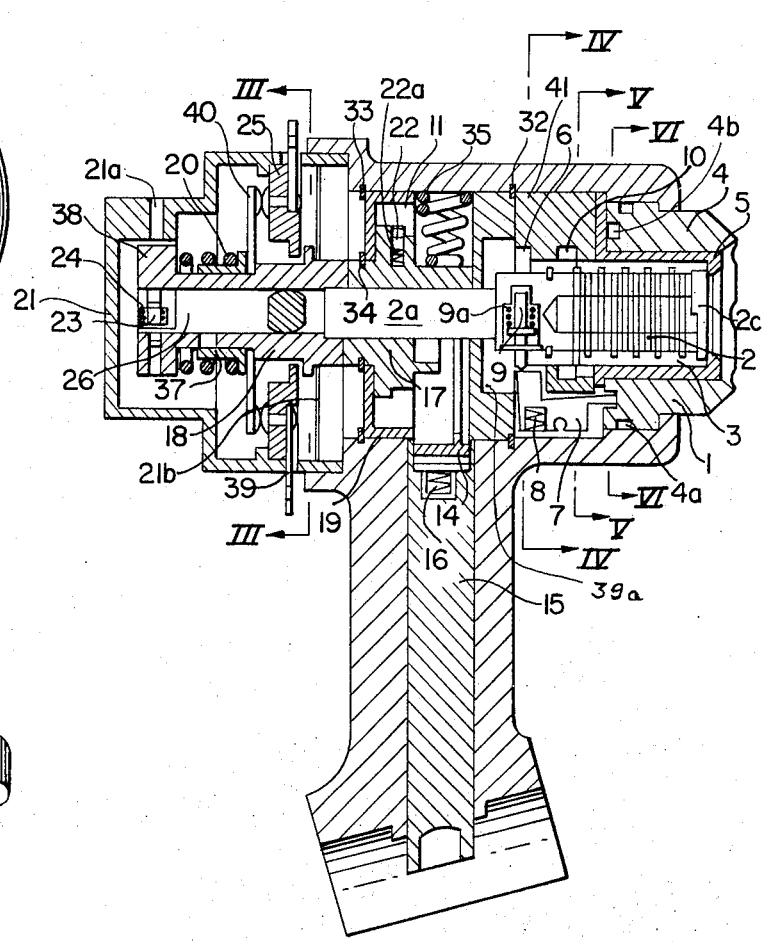
FIG. 2 is a horizontal section on the line II — II of FIG. 1.

The mechanical components and features shown in detail in FIG. 2 comprise a main body 1 having a lock barrel 2 with an axially extending round extension portion 2a which includes a D section and a key stop member 2c.

Figure 2A:
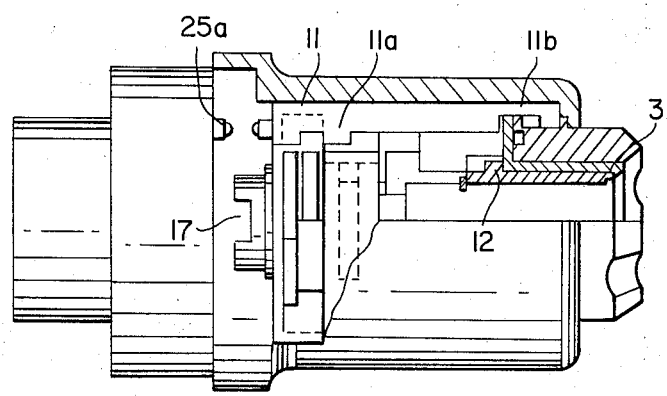
FIG. 2a is a part sectional view showing a detail of FIG. 2 in clear context.
Figure 5A:
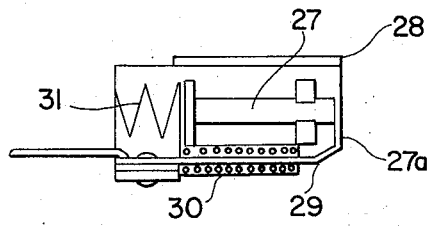
FIGS. 5a and 5b are elevational views on the line V—V of FIG. 2.
Figure 5B:
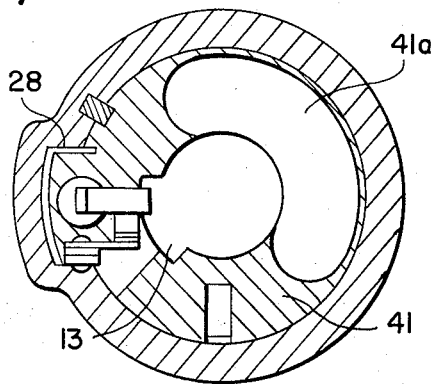
Figure 6:
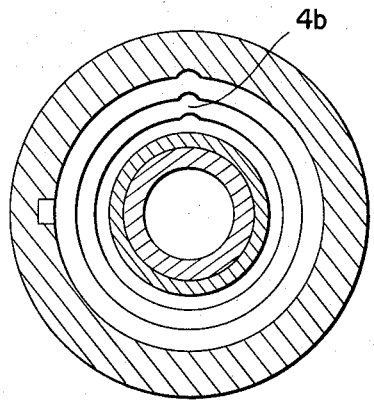
Figure 7A:
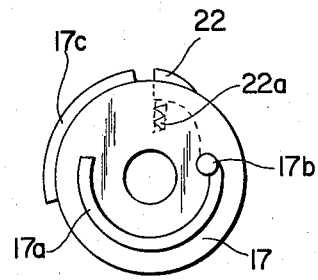
FIGS. 7a–7e show details of an aspect generally referred to at 17 of FIG. 2.
Figure 7B:
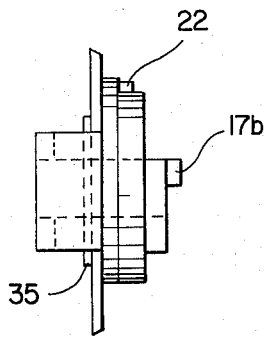
Figure 7C:
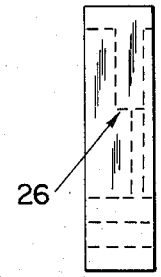
Figure 7D:
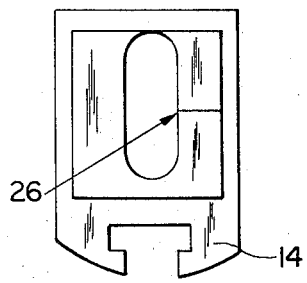
Figure 7E:
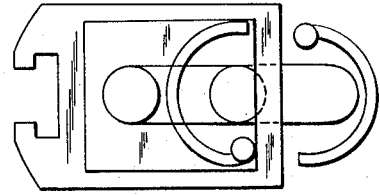

The lock barrel 2 is mounted in a sleeve 3 which is disposed in the main body so as to resist rotation by a key 12, FIG. 2a, in a keyway 13, FIG. 5. This condition prevails when the device is in the normal position, that is to say, when not upset by attempted forcing.

A selector ring 4 disposed in the front of the device is mounted together with the lock barrel on a bearing 5.

A cavity 6 in block 41 is adapted to accept a control plunger 9 in the reset condition of the device while a tension lever 7 has a cavity at one end thereof arranged to mate with the head of this plunger. The plunger is thus designed to constrain axial movement of the lock barrel and associated sleeve 3 within a specified pressure at one predetermined point. In the upset condition of the device, the plunger will then prevent the lock-barrel 2 from being pulled back into the operating position. A spring 9a influences the plunger 9 in position irrespective of whether that position is the operating or upset one, while a spring 8 acts as a counterbalance to 9a.

A groove or cavity 10 in the block portion 41 of the interior of the device permits the key 12 of control sleeve 3 and lock barrel 2 to rotate when the lock barrel and key have moved axially inwards rendering the device in the upset condition.

A push bar 11, shown in detail in FIG. 2a is affected through a lug 11b in the cam track 4a of the selector ring 4 to operate a set of contacts mounted on the front side of a fixed contact block 25. These contacts start the thermal timing device and selector release solenoid. This also ensures a secondary operation on turn off.

An operating block 14 FIG. 7 is designed to control the locking of the steering through the medium of a bolt 15. This block provides positive retraction of the bolt.

A cam assembly 17 held in position in plate 19 by the circlip 34 is provided to operate the block 14. This assembly comprising a number of elements is shown in considerable detail in FIG. 7. A track 17a designed to lift the block 14 has a lug 17b at one end to supply extra lift to move the block against a step 26 thereon when the key is rotated to start the engine, that is, to run position, while an element 17c prevents the selector ring 4 from being turned back to the off position without first turning the key in the correct sequence.

A dog member 18 which engages the cam assembly 17 is carried forward by the extension 2b but allows restoration of the lock barrel when the device is being reset. A compression spring 20 maintains the dog 18 and cam members in contact through a plate 19 which carries the cam assembly 17. The compression spring 20 which is disposed in the housing 21 of the devices electrical contact assembly also serves to maintain the contacts and tails 39 thereof in operable association with the movable contact plate 40.

A sleeve 37 carries the tension spring 20 and prevents it from obstructing the movement of the dog 18.

Disposed in the contact assembly housing 21 is a fixed contact plate member 25. This plate which is of course electrically insulated embodies a membrane which maintains the working tension needed for the contacts and to prevent upset of the device when in the run condition. This membrane is designed to shatter at a preselected G factor of the apparatus generally so as to operate in a "fail safe" manner, say, on severe frontal impact for the axially movable items 2, 3, 2a and associated parts.

The switch device according to the invention also embodies a timing assembly. This assembly provided to limit the period in which the action of inserting the key and unlocking the steering and starting the engine of the vehicle is effected comprises a number of elements shown in detail in FIG. 5. The assembly which is adapted to operate thermostatically is mounted on a plate 28 and includes a pull back latch 27 governed by a tension spring 31, a bi-metal holding latch 29 and its associated heating element 30.

A circlip 32 is disposed between the block 41 and plate 39, while a similar clip 33 holds cam assembly in place.

A spring 35, not previously referred to, is provided to restore the block 14 during turn off and override tension for engine run.

In operation, to switch on, the selector ring 4 is turned to a predetermined random number, for example 1, 2, 3 or 4 as shown in FIG. 1, appropriate for that lock (not related to the key series). This number is known only to the key holder. Thus in any other position the device would behave as in the off position. Correctly positioning the ring 4 will require coordination as there is no click register on this component nor noticeable variation in tension so the correct position will not be felt by an operator trying to discover what the number is. Any undue forward pressure upsets the lock barrel 2 which the operator unless he be the key holder cannot bring back to its operating position because plunger 9 is forced into the recess 39a by its spring 9a. The action of re-set will be given in detail later.

Figure 3A:
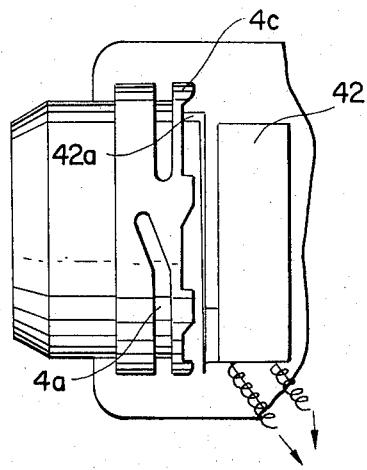
FIGS. 3a and 3b are elevational views on the line III—III of FIG. 2.
Figure 3B:
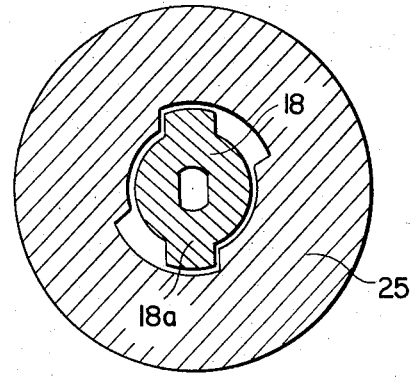

In turning the selector ring 4 from the off position the lug 11b runs in the track 4a and in approximately 15° will have moved bar 11 to a point at which the contacts 25a, FIG. 2a are made thus extending the battery supply through a back contact of the assembly 25 and 40 to the thermal timing device and the selector solenoid 42, FIG. 3, positioned in a cavity 41a in block 41. The energising of solenoid 42 will withdraw pawl 42a from the hard side of the serrations 4c and allows for the turning of the selector ring past the 15° mark until the appropriate number is reached. If for reasons of compromising the timing feature the battery supply were interrupted with the intention of restoring it at the point when the key has been turned to the start point, this would be ineffective since the selector solenoid would not operate and the selector ring could not be turned in the first instance to any number whereby the key can be inserted. The hump 4b is displaced to correspond to the number appropriate to a particular lock and the test of co-ordination is to line the number up with the slot of the key-hole.

Figure 4:
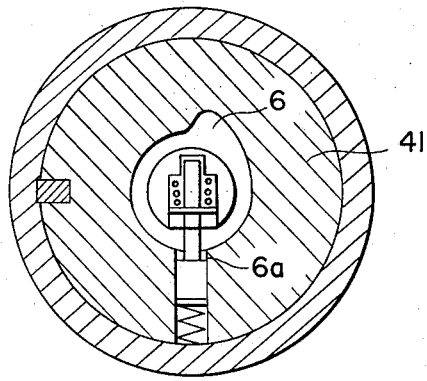
FIG. 4 is a cross-section on the line IV — IV of FIG. 2.

It is necessary to utilize the peak of the 4b because it requires the full extent of this small movement to operate the lever 7 where sufficient pressure is built up in conjunction with plunger 9 to allow even the correct key to be inserted. Plunger 9 has a spherical head which mates with a concave depression in lever 7 and the combination of these surfaces together with the springs 8 and 9a give constraint to the axial movement of the key section and yet no indication of the fact when turning ring 4. Also, the plunger 9 must be fully depressed otherwise it will not clear the recess 6a, FIG. 4, and the key could not be turned.

OPERATION OF KEY

Insertion of the key should now be carried out having positioned the selector ring, remembering that the timing sequence has been set in motion. Insert key into slot using a steady hand and without clumsiness otherwise lock barrel 2 and all its associated parts goes forward into the upset or free wheeling position, with the key in the slot turn on in the normal way, as is the case with conventional locks, to the fire position.

When the correct key has been inserted and turned successfully without causing the lock barrel to upset, the dog 18 engaged with the cam 17, lifts operating block 14 (see FIG. 7) and lifts bolt 15 out of engagement with the steering column. At the time of lifting the bolt 15, the spring 35 is effective, in the override condition to fire the engine, to keep block 14 in its lower position against the profile 17a. It is only when the lug 17b engages the step 26 in the block 14 which provides an engine fire position, but this block goes back to an engine run position urged by the spring 35. Dog 18 is made of nylon or similar material and rotates to move contact plate 40 mounted on a square section together against spring 20, key is moved into override condition to fire. The timing system and selector solenoid will be disconnected before the profile 18a moves to a point where it can be obstructed by the membrane 25.

In other words, considering the lock against theft the thief does not know either (a) whether he has picked the lock or not because (b) he might not have chosen the right number for the selector ring.

TURNING OFF

As regards turning off the lock, the key is turned anti-clockwise and comes to a stop at the 3 o'clock position by virtue of pawl 22 spring loaded by coil spring 22a being obstructed by notch 11a on contact bar 11.

If the key is left in this position it can provide a warning means, as required in some countries to warn the driver on opening the vehicle door, that he has left his key in the lock and to deter him from leaving it in on purpose to avoid the starting procedure.

To turn-off fully the selector ring 14 is turned clockwise back to 0. (The key is always rotated in opposite direction to the selector ring to prevent accidental or deliberate operation of selector ring thus ensuring a separate operation to lock column) When the selector ring gets to zero, it withdraws the contact operating lever 11, thus releasing the lug member 11a from the path of the pawl 22. This will permit the key to be turned fully off, allowing block 14 to be pushed into position by the spring 35 thus carrying bolt 15 into a locking position. This may prime spring 16 depending on the position of the cavity in the column.

In the running position the profile of the dog 18 is obstructed by the membrane 25, thus if the engine stalls for some reason other than a high frontal impact it is sufficient to restart the engine normally, by turning the key. The contact pressure for the running position may be increased. With high impact on the membrane the lock barrel 2 and associated parts move forward disconnecting the contacts and the engine, petrol pump etc., in case of a risk of fire.

When the switch has been upset by any maloperation, the key 12 on sleeve 3 held in keyway 13, in block 41, which prevents radial movement of control sleeve in normal position. Sleeve 3 moves forward under spring pressure taking key out of keyway 13, the sleeve now rotating freely but the bolt remaining locked because dog 18 is disengaged from 17a. As regards attempts to drill or pick the lock, any forward pressure against the lock brings the sleeve and lock barrel into the free-wheeling or upset position as described above and in detail in British Pat. No. 1 041 581.

The back of the lock is sealed by means of the contact block assembly. This clips in with an internal brace 21b and requires a special tool to depress the prongs to release. Before the block can be withdrawn it is necessary to turn the key to the run position with the lock in the normal working position when the plunger 23 spring loaded by spring 24 will line up with the hole 21a. A probe can now be pushed through to depress plunger 23 and the block withdrawn because plunger 23 will be disengaged from buffer boss 38.

To reset the lock the selector ring is turned to zero, the correct key inserted and given a flick in a clockwise direction to overcome friction between the sleeve 3 and the lock-barrel 2 thus bringing stop 2c to the limit of its radial travel with respect to sleeve 3. The key is now turned until the overhang of key lines up with the mark between 2 and 3 and this brings the key 12 into line with the reset mark 4d, key section can now be pulled back and this 'pull back' must be held because profile 18 will be behind membrane 25 and spring 20 is compressed otherwise the sleeve 3 and lock barrel 2 will go forward. When the key is turned fully off, the profile 18a will return through the cavity in the membrane 25, the dog 18 dropping into engaged position with the cam 17 and the switch device will be once more ready for normal operation.

Reset is the same after thermal cut-out except that one has to wait for the timing device to cool down. The key 12 on the control sleeve will pull back the latch 27 of the thermal timer, compressing spring 31 and the bi-metal lip plate 29 will hold in readiness by virtue of an extension 27a on latch 27.

While the invention has been particularly described in connection with a specific embodiment it will be apparent to those skilled in the art that various changes and modifications may be made therein without departing from the scope of the invention. For example, in respect of the timing device, the thermal trip (the thermostat embodying a heating element and bi-metal strip) assembly can be replaced by a solenoid trip which is activated by an integrated pulse generator which can be housed in a nodule 42 on the casing of the inventive device. The circuit of this device can be switched in a like manner to the existing thermostatic assembly: if the lock is upset either by the time feature or some malfunction, the pulse generator will continue to operate by logging up penalties, say, into an associated Summer unit, resetting and turning the key to ON in the normal way cancelling the penalties, if done within the preselected time, otherwise cutting the battery supply.

I claim:

1. An interlock switch for starting a motor vehicle which requires careful operation to prevent use of the vehicle by unauthorized persons and persons not in full control of their faculties comprising a housing, a lock barrel rotatably mounted and axially slidable therein, a key for said lock barrel, a selector ring means adapted to be set to a preselected position for unlocking said lock by said key, immobilizing means operable by predetermined excessive forward pressure of said key in said lock barrel to move the barrel axially in the housing to prevent unlocking the lock and to prevent retraction of said lock barrel by said key, electrical circuit means for starting the motor, means for completing the electrical circuits of said circuit means when the selector ring means is properly set and the key is properly rotated.

2. An interlock switch as claimed in claim 1 and further comprising timing means operable by said immobilizing means for determining the period within which said selector ring means and said key means may be reset in starting position for the unlocking operation.

3. An interlock device as claimed in claim 2 wherein the timing means is a thermostatic means.

4. An interlock device as claimed in claim 3 wherein said thermostatic means includes a bi-metal strip.

5. An interlock device as claimed in claim 1 wherein said electrical circuit means includes a contact plate mounted on said axially slidable lock barrel and fixed contacts cooperating with said contact plate to complete the electrical circuits.

6. An interlock device as claimed in claim 1 wherein said selector ring means is a ring with markings thereon and interconnected with said lock barrel.

7. An interlock device as claimed in claim 2 and further comprising means connecting said selector ring means with said timing means so that movement of said selector ring means initiates the operation of said timing means.

8. An interlock device as claimed in claim 2 and further comprising means interconnecting said timing means and said selector ring means with said electric circuit means so that when said circuit means is disconnected said selector ring can not be set in its proper position for accepting said key.

9. An interlock device as claimed in claim 1 and further comprising a membrane element adapted to shatter when high impact forces due to collision cause the axially slidable lock barrel to move in its housing, to disconnect said electrical circuit means.

10. An interlock device as claimed in claim 9 and further comprising means for rendering said lock barrel inoperative when said membrane is shattered.

* * * * *